United States Patent
Pettersson et al.

(10) Patent No.: US 9,771,062 B2
(45) Date of Patent: Sep. 26, 2017

(54) METHOD FOR BRAKING A VEHICLE

(71) Applicant: Scania CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 331 days.

(21) Appl. No.: 14/411,137

(22) PCT Filed: Jun. 26, 2013

(86) PCT No.: PCT/SE2013/050774
§ 371 (c)(1),
(2) Date: Dec. 24, 2014

(87) PCT Pub. No.: WO2014/003656
PCT Pub. Date: Jan. 3, 2014

(65) Prior Publication Data
US 2015/0191165 A1     Jul. 9, 2015

(30) Foreign Application Priority Data

Jun. 27, 2012    (SE) ...................................... 1250706

(51) Int. Cl.
*B60W 10/08*      (2006.01)
*B60W 10/115*    (2012.01)
(Continued)

(52) U.S. Cl.
CPC ........... *B60W 20/108* (2013.01); *B60K 6/365* (2013.01); *B60K 6/48* (2013.01); *B60L 7/20* (2013.01);
(Continued)

(58) Field of Classification Search
CPC .... B60W 10/02; B60W 10/08; B60W 10/115; B60W 20/15; B60W 20/30; B60W 30/18109
See application file for complete search history.

(56) References Cited

U.S. PATENT DOCUMENTS

| 6,054,776 A | 4/2000 | Sumi ............................... 290/17 |
| 6,302,227 B1 | 10/2001 | Takemura et al. ........... 180/65.2 |

(Continued)

FOREIGN PATENT DOCUMENTS

EP       1 319 546 A1     6/2003

OTHER PUBLICATIONS

International Search Report mailed Nov. 15, 2013 in corresponding PCT International Application No. PCT/SE2013/050774.

*Primary Examiner* — Huan Le
(74) *Attorney, Agent, or Firm* — Ostrolenk Faber LLP

(57) ABSTRACT

A method for braking a vehicle driving forward, in which the vehicle has a propulsion system including a combustion engine with an output shaft (2*a*), a gearbox (3) with an input shaft (3*a*), an electric machine (9) comprising a stator and a rotor, and a planetary gear comprising three components in the form of a sun gear (10), a ring gear (11) and a planet wheel carrier (12). The vehicle is driven with one of the components connected to an output shaft of the combustion engine rotating with a lower rotational speed than one of the components connected to the electric machine. When the vehicle is braked, the electric machine is controlled to apply a brake torque to the input shaft of the gearbox, making the rotational speed of the combustion engine increase.

8 Claims, 4 Drawing Sheets

(51) Int. Cl.
  *B60W 20/00*  (2016.01)
  *B60K 6/365*  (2007.10)
  *B60L 7/20*  (2006.01)
  *B60L 15/20*  (2006.01)
  *B60K 6/48*  (2007.10)
  *B60W 30/18*  (2012.01)
  *B60W 20/15*  (2016.01)

(52) U.S. Cl.
  CPC ....... *B60L 15/2009* (2013.01); *B60L 15/2054* (2013.01); *B60W 10/08* (2013.01); *B60W 10/115* (2013.01); *B60W 20/00* (2013.01); *B60W 20/15* (2016.01); *B60W 30/18127* (2013.01); *B60W 30/18136* (2013.01); *B60L 2240/12* (2013.01); *B60L 2240/421* (2013.01); *B60L 2240/423* (2013.01); *B60L 2240/441* (2013.01); *Y02T 10/6221* (2013.01); *Y02T 10/645* (2013.01); *Y02T 10/72* (2013.01); *Y02T 10/7275* (2013.01); *Y10S 903/93* (2013.01); *Y10T 477/33* (2015.01)

(56) References Cited

U.S. PATENT DOCUMENTS

| | | | |
|---|---|---|---|
| 2001/0029220 A1 | 10/2001 | Kato | 477/5 |
| 2002/0063000 A1 | 5/2002 | Kojima | 180/65.1 |
| 2002/0094899 A1 | 7/2002 | Hamai | 475/5 |
| 2003/0062206 A1* | 4/2003 | Fujikawa | B60K 6/383 180/65.25 |
| 2009/0145673 A1* | 6/2009 | Soliman | B60K 6/442 180/65.1 |
| 2010/0173746 A1 | 7/2010 | Ideshio et al. | 477/36 |

\* cited by examiner

METHOD FOR BRAKING A VEHICLE

CROSS-REFERENCE TO RELATED APPLICATIONS

The present application is a 35 U.S.C. §§371 National Phase conversion of PCT/SE2013/050774, filed Jun. 26, 2013, which claims priority of Swedish Patent Application No. 1250706-7, filed Jun. 27, 2012, the contents of which are incorporated by reference herein. The PCT International Application was published in the English language.

FIELD OF THE INVENTION AND PRIOR ART

The present invention relates to a method for braking a vehicle driving forward.

The invention is especially but not exclusively directed to carrying out such a method for motor vehicles in the form of wheeled utility vehicles, especially heavy vehicles, such as trucks and buses.

Accordingly, the invention relates to a method for braking a hybrid vehicle driving forward, in which such a vehicle is generally a vehicle which may be driven by a primary engine, here a combustion engine, and a secondary engine, here an electric machine. The electric machine is suitably provided with means for storing energy, such as a battery or a capacitor for storing electric energy, and regulating equipment for regulating the flow of electrical energy between said means and the electric machine. The electric machine may by this operate as a motor or a generator depending upon the state of operation of the vehicle. When the vehicle is braked, the electric machine generates electrical energy which may be stored, and the electrical energy stored may later be utilized for, for example, driving the vehicle.

The utilization of a conventional clutch mechanism disconnecting the input shaft of the gearbox with respect to the combustion engine during the gearchanging process in the gearbox results in disadvantages, such as heating of the discs of the clutch mechanism, which results in an increased fuel consumption and wear of the clutch discs. Considerable losses are then also caused when starting the vehicle. Furthermore, a conventional clutch mechanism is comparatively heavy and costly. It requires also a comparatively large space in the vehicle. Friction losses are also created when using a hydraulic converter/torque transformer usually used in automatic gearboxes. The conventional clutch mechanism and said disadvantages associated therewith may be avoided by providing the vehicle with a propulsion system in which the output shaft of the combustion engine, the rotor of the electric machine and the input shaft of the gearbox are interconnected by a planetary gear. A vehicle having a propulsion system of this type is known through EP 1 319 546.

There is of course an ongoing attempt to improve the way to drive a vehicle having such a propulsion system with respect to energy efficiency and to regenerate as much as possible of the brake energy when braking the vehicle.

SUMMARY OF THE INVENTION

The object of the present invention is to provide a method of the type defined in the introduction considering the attempt mentioned above.

This braking is used when driving with a so-called free planetary gear (the locking means in the releasing position) at a little higher speeds. The most usual reason to drive the vehicle with free planetary gear at higher speeds is to save fuel at low propulsion system torques by letting the combustion engine run with low rotational speeds. When applying a brake torque through the electric machine exceeding said product, the rotational speed of the combustion engine will increase, which according to the invention is utilized for obtaining a smooth braking due to increasing the rotational speed of the combustion engine so that the first component gets a rotational speed synchronous with respect to the third component and the input shaft of the gearbox without any need to use fuel. When the planetary gear is then locked (its locking means is in the locking position) the electric machine may brake by an optional torque, which may then be chosen to be high, if desired. Braking while regenerating braking energy may be carried out very energy efficiently. It is pointed out that braking the vehicle is made with the torque that is requested and that is possible to apply and is not targeted by a torque exceeding said product. It is a problem when braking with a so-called free planetary gear that only a restricted brake torque may be applied, since when this exceeds said product and the rotational speed of the combustion engine rises. However, that fact is here utilized for obtaining a state in which the planetary gear may be transferred to a locked state and continued braking may then take place by an arbitrary high torque.

According to an embodiment of the invention the method is carried out for a vehicle having a propulsion system with the sun gear as the first component and the ring gear as the third component, and such a propulsion system is described in unpublished SE 1051384-4 and has a number of advantages with respect to a propulsion system according to EP 1 319 546 mentioned above, which has the ring gear as the first component and the sun gear as the third component. A compact construction is easy to build in spaces already existing for drivetrains (propulsion systems) having clutch mechanisms instead of planetary gears. Such construction is obtained by connecting the electric machine with the ring gear and the output shaft of the combustion engine with the sun gear. A hybridized gearbox may by this be made size and weight compatible with a standard gearbox and standardized interfaces may be maintained. This means that the weight increase normally associated with a hybridization may be reduced considerably. Another advantage is that a connection of the electric machine with the ring gear means a higher possible brake torque through this than if the electric machine is instead connected to the sun gear.

According to another embodiment of the invention the rotational speeds of the sun gear and ring gear are compared in a step, of comparing rotation speeds of a sun gear, ring gear and planet wheel carrier of the system which step is suitable.

According to another embodiment of the invention the sun gear and planet wheel carrier are interlocked in a locking step, which means that an interlocking may be realized reliably and by simple means. A lower torque is as a result transferred through the planetary gear wheels. Only the torque of the electric machine is then transferred through the planetary gear wheels.

According to another embodiment of the invention the electric machine is controlled in by applying a brake moment through the third component to the input shaft of the gearbox exceeding said product by at least 1%, at least 10% or at least 30%. It is by this ensured that the rotational speed of the first component connected to the output shaft of the combustion engine is increased during the braking for approaching the rotational speed of the third component.

The invention also relates to a computer program, a computer program product, an electronic control unit for controlling the method and a vehicle in which the method is performed.

Other advantageous features and advantages of the invention appear from the description following below.

BRIEF DESCRIPTION OF THE DRAWINGS

With reference to the appended drawings, below follows a description of an embodiment of the invention cited as an example.

In the drawings.

DETAILED DESCRIPTION OF AN EMBODIMENT OF THE INVENTION

Figure 1:
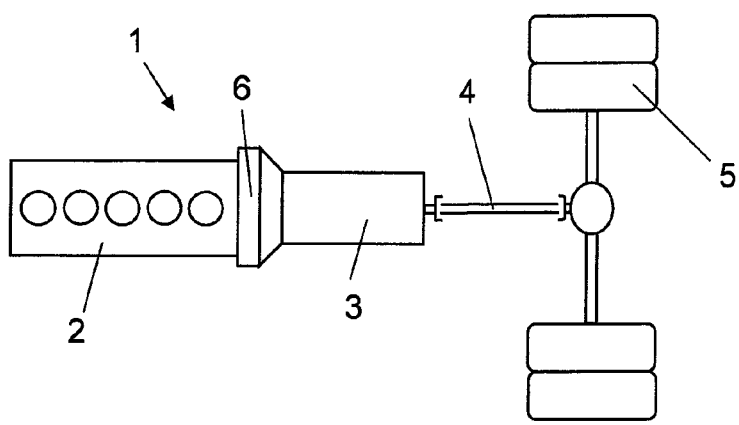
FIG. 1 is a very simplified view of a drivetrain of a vehicle for which a method according to the invention may be carried out.
Figure 2:
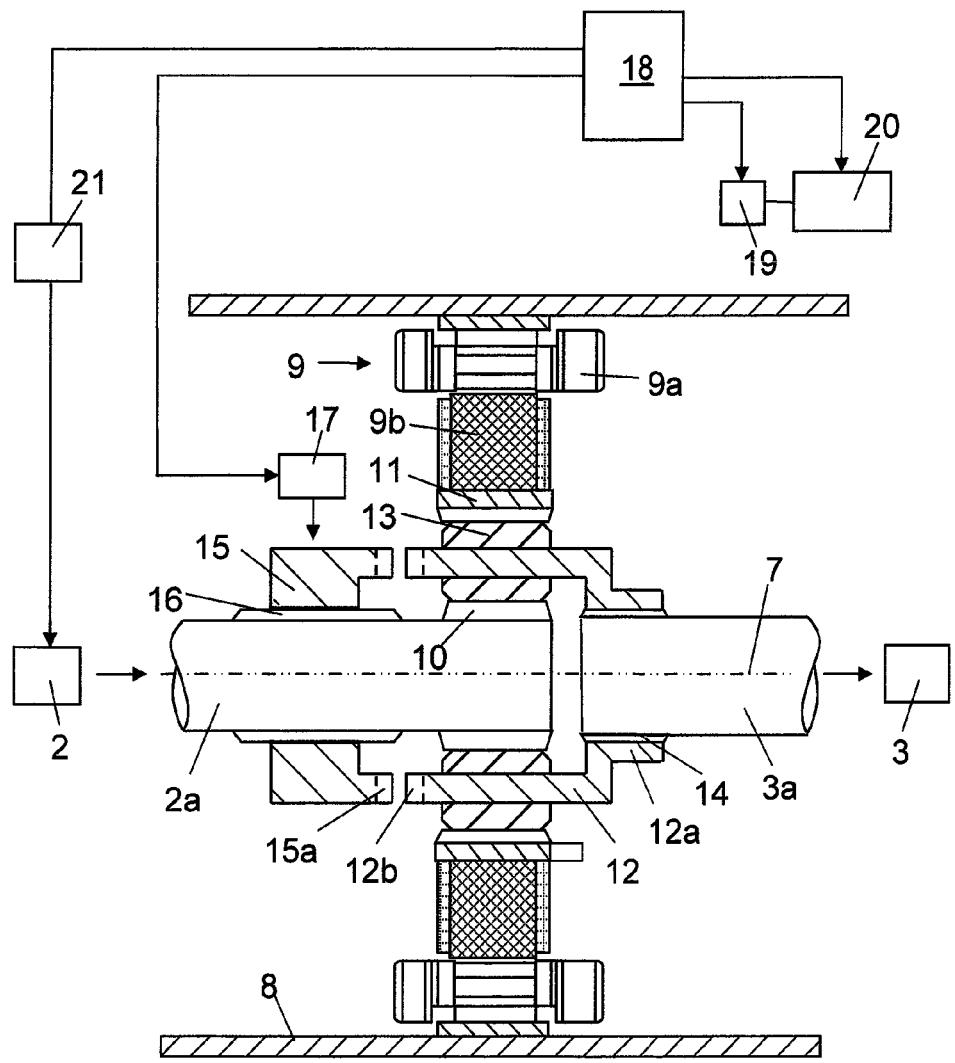
FIG. 2 is a still simplified but more detailed view of a part of a said propulsion system.

FIG. 1 shows a drivetrain for a heavy vehicle 1. The drivetrain comprises a combustion engine 2, a gearbox 3, a number of drive shafts 4 and drive wheels 5. The drivetrain has between the combustion engine 2 and the gearbox 3 an intermediate portion 6. FIG. 2 shows more in detail the components in the intermediate portion 6. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox are arranged to rotate around a rotation axis 7 in common. The intermediate portion 6 comprises a housing 8 enclosing an electric machine 9 and a planetary gear. The electric machine 9 comprises as usual a stator 9a and a rotor 9b. The stator 9a comprises a stator core secured in a suitable way on the inner side of the housing 8. The stator core comprises stator windings. The electric machine 9 is adapted to in certain operational situations utilize electric energy stored for supplying drive power to the input shaft 3a of the gearbox and in other operation situations utilize kinetic energy of the input shaft 3a of the gearbox for generating and storing electric energy.

The planetary gear is arranged substantially radially internally of the stator 9a and the rotor 9b of the electric machine. The planetary gear comprises as usual a sun gear 10, a ring gear 11 and a planet wheel carrier 12. The planet wheel carrier 12 carries a number of gear wheels 13 rotatably arranged in a radial space between the teeth of the sun gear 10 and the ring gear 11. The sun gear 10 is secured to a circumferential surface of the output shaft 2a of the combustion engine. The sun gear 10 and the output shaft 2a of the combustion engine rotate as a unit with a first rotational speed $n_1$. The planet wheel carrier 12 comprises a fastening portion 12a fastened to a circumferential surface of the input shaft 3a of the gearbox by means of a splined connection 14. Due to their connection the planet wheel carrier 12 and the input shaft 3a of the gearbox may rotate as a unit with a second rotational speed $n_2$. The ring gear 11 comprises an external circumferential surface onto which the rotor 9b is secured. The rotor 9b and the ring gear 11 form a rotatable unit rotating with a third rotational speed $n_3$.

The propulsion system comprises a locking means comprising the output shaft 2a of the combustion engine being provided with a displaceable coupling member 15. The coupling member 15 is fastened to the output shaft 2a of the combustion engine by a splined connection 16. The coupling member 15 is in this case fixed against rotation by being fixed to the output shaft 2a of the combustion engine and is displaceable in the axial direction on the output shaft 2a of the combustion engine. The coupling member 15 comprises a coupling portion 15a connectable to a coupling portion 12b of the planet wheel carrier 12. A displacing member 17 schematically shown is adapted to displace the coupling member 15 between a first position in which the coupling portions 15a, 12b are not mutually engaged corresponding to a releasing position of the locking means and a second position in which the coupling portions 15a, 12b are mutually engaged corresponding to a locking position of the locking means. The output shaft 2a of the combustion engine and the input shaft 3a of the gearbox will in this locking position be interlocked and these and the rotor of the electric machine will by that rotate with the same rotational speed. This state may be called locked planet. The locking mechanism may also comprise a sleeve provided with first splines which in the releasing position engage second splines on a first component of the planetary gear and in the locking position engage third splines on a second component of the planetary gear. The first component is in this case preferably the planet wheel carrier and the second component the sun gear. The locking mechanism may then be designed as a sleeve with a ring shape enclosing the planet wheel carrier substantially concentrically.

An electric control unit 18 is designed to control the displacing member 17. The control unit 18 is also configured to decide on which occasions the electric machine shall operate as a motor and on which occasions it shall operate as a generator. For deciding this, the control unit 18 may receive current information about suitable operation parameters. The control unit 18 may be a computer with software for this task. The control unit 18 controls a regulating equipment 19 schematically shown, which regulates the flow of electric energy between a hybrid battery 20 and the stator windings 9a of the electric machine. On occasions when the electric machine 9 operates as a motor, electric energy stored is supplied from the hybrid battery 20 to the stator 9a. On occasions when the electric machine operates as a generator, electric energy is supplied from the stator 9a to the hybrid battery 20. The hybrid battery 20 delivers and stores electric energy with a voltage on the order of 200-800 volts. Since the intermediate portion 6 between the combustion engine 2 and the gearbox 3 in a vehicle is restricted, it is required that the electric machine 9 and the planetary gear constitute a compact unit. The components 10, 11, 12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are here arranged to rotate around a rotation axis 7 in common. The electric machine 9 and the planetary gear occupy a comparatively small space due to such a design. The vehicle 1 is provided with a motor control function 21 through which the rotational speed $n_1$ of the combustion engine 2 may be regulated. The control unit 18 has by that a possibility to activate the motor control function 21 and create a state of zero torque in the gearbox when gears in the gearbox 3 are engaged and disengaged. The propulsion system may be controlled by several different control units instead of being controlled by one single control unit 18.

Figure 4:
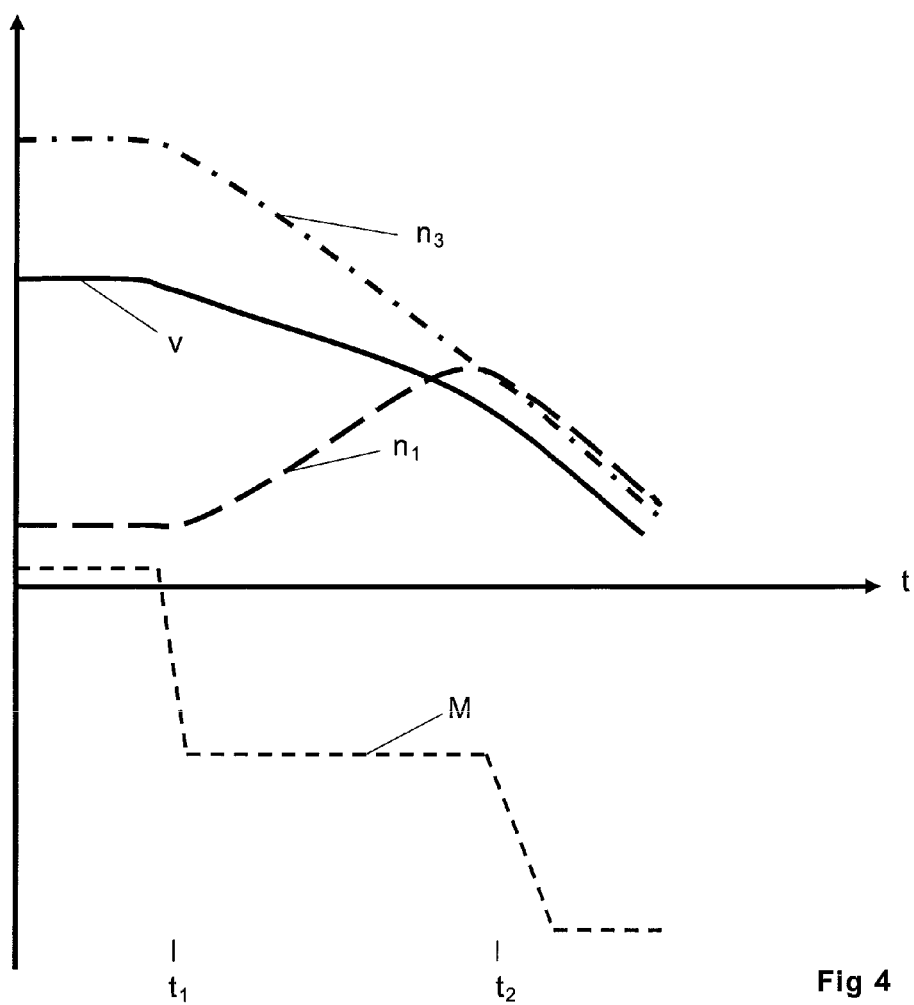
FIG. 4 shows how the rotational speed of the combustion engine shaft and the rotor of the electric machine of the propulsion system according to FIG. 2 and the vehicle speed and the torque of the electric machine vary over time when carrying out a method according to an embodiment of the invention for braking the vehicle driving forward.
Figure 5:
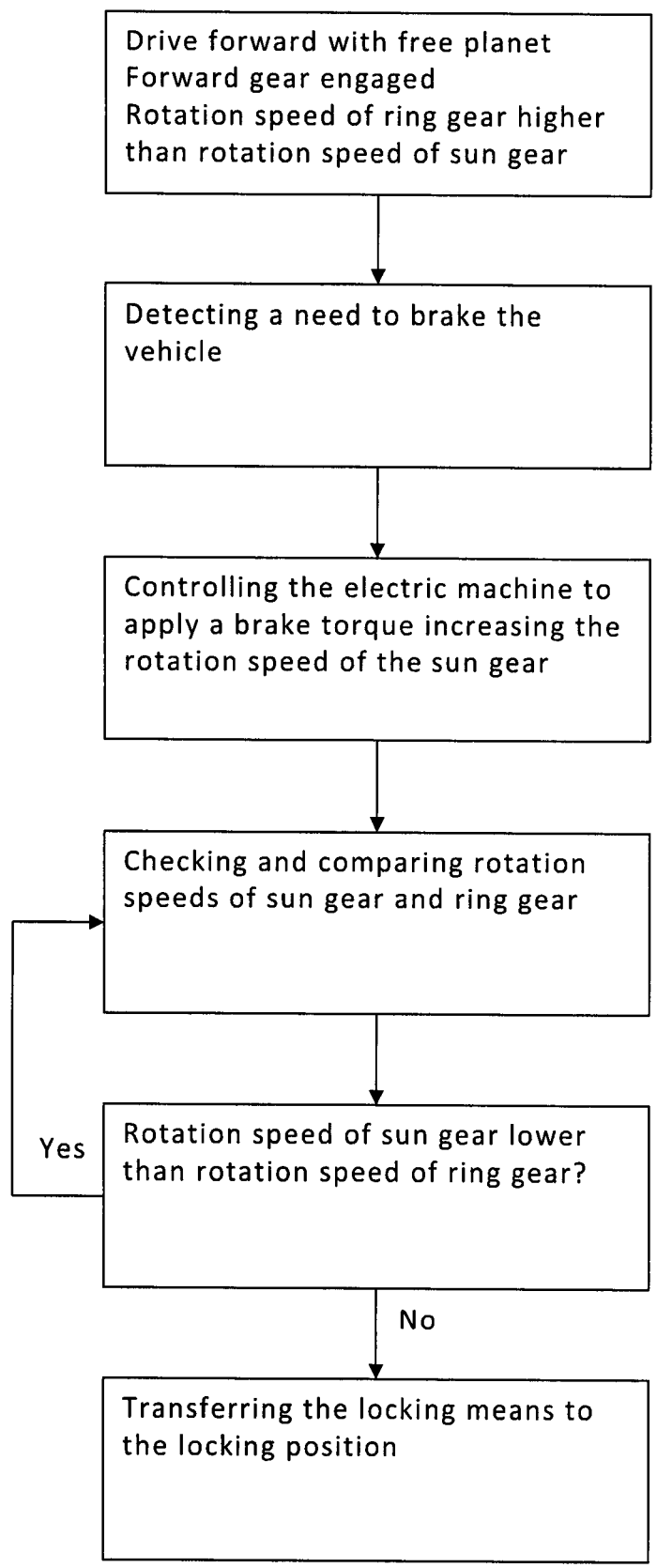
FIG. 5 is a flow chart illustrating a method according to an embodiment of the invention.

FIG. 5 shows a flow chart illustrating a method according to an embodiment of the present invention for braking a vehicle driving forward, in which the vehicle has a propulsion system of the type shown in FIG. 2. FIG. 4 shows the rotational speeds of the output shaft of the combustion engine and the rotor of the electric machine $n_1$ and $n_3$, respectively, the speed v of the vehicle and the brake torque M of the electric machine plotted versus the time t for carrying out this method.

When the method is started, the vehicle is driven forward with the locking means in the releasing position and a forward motion gear engaged. The speed of the vehicle is comparatively high, e.g. at least 10 km/h, and the combustion engine runs at a low rotational speed so that fuel is saved. The ring gear rotates with a higher rotational speed than the sun gear. A need to brake the vehicle is then detected.

The braking is then started by the control unit 18, which at the time $t_1$ controls the electric machine 9 to apply brake torque M requested to the input shaft 3a of the gearbox. If this exceeds the product of the torque needed for driving the combustion engine to rotate (the torque needed when idling for overcoming friction losses and drive the combustion engine to rotate) and the transmission ratio of the planetary gear (between the sun gear and the planet wheel carrier), the method according to the invention may be performed. The transmission ratio of the planetary gear is then defined as the number of teeth of sun gear/(the number of teeth of the sun gear+the number of teeth of the ring gear). This means that the rotational speed $n_1$ of the output shaft of the combustion engine will increase and approach the decreasing rotational speed $n_3$ of the ring gear connected to the rotor of the electric machine. The brake torque applicable through the electric machine is restricted. The rotational speeds of the sun gear and the ring gear are checked and compared during the braking procedure, and when these are substantially equal, which occurs at the time $t_2$, the coupling member 15 is displaced and by that the locking means transferred to the locking position. Substantially equal means here that the difference between the rotational speeds is so small that an interlocking may take place. The planetary gear is after that locked and the brake torque applicable by the electric machine on the input shaft of the gearbox may then be maximized if desired. This way to move from free planet to locked planet during braking of the vehicle results in a smooth/even brake torque and means that no fuel has to be used during the braking and locking procedure.

Computer program code for implementing a method according to the invention is suitably included in a computer program which is readable into an internal memory of a computer, such as the internal memory of an electronic control unit of a motor vehicle. Such a computer program is suitably provided through a computer program product comprising a non-transitory data storing medium readable by an electronic control unit, which data storing medium has the computer program stored thereon. Said data storing medium is for example an optical data storing medium in the form of a CD-ROM-disc, a DVD-disc, etc., a magnetic data storing medium in the form of a hard disc, a diskette, a tape etc., or a Flash memory or a memory of the type ROM, PROM, EPROM or EEPROM.

Figure 3:
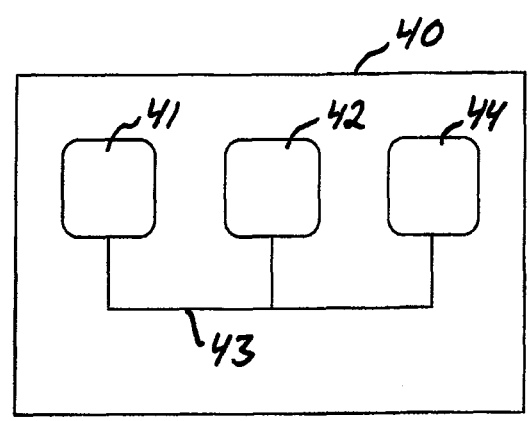
FIG. 3 is a sketch in principle of an electronic control unit for implementing a method according to the invention.

FIG. 3 illustrates very schematically an electronic control unit 40 comprising an execution means 41, such as a central processor unit (CPU), for executing a computer program. The execution means 41 communicates with a memory 42, for example of the type RAM, through a data bus 43. The control unit 40 comprises also a non-transitory data storing medium 44, for example in the form of a Flash memory or a memory of the type ROM, PROM, EPROM or EEPROM. The execution means 41 communicates with the data storing medium 44 through a data bus 43. A computer program comprising computer program code for implementing a method according to the invention, for example in accordance with the embodiment illustrated in FIG. 5, is stored on the data storing medium 44.

The invention is of course not in any way restricted to the embodiments described above, but many possibilities to modifications thereof would be apparent to a person with skill in the art without departing from the scope of the invention as defined in the appended claims.

The locking means may be designed to interlock any two of said three components.

A transmission could be arranged between the rotor and the ring gear and also between the output shaft of the combustion engine and the sun gear, such as upstream of the shaft shown in the figures to be connected to the sun gear. The transmission last mentioned could also be formed by a variable gear.

It is also conceivable that the method is carried out for a vehicle having the ring gear as the first component and the sun gear as the third component, although the opposite would probably often be preferred through the advantages thereof mentioned above.

The invention claimed is:

1. A method for braking a vehicle that is driving forward, wherein the vehicle has a propulsion system comprising a combustion engine with an output shaft, a gearbox with an input shaft, an electric machine comprising a stator and a rotor, and a planetary gear set comprising three components: a sun gear, a ring gear and a planet wheel carrier;

the output shaft of the combustion engine is connected to a first component of the three components of the planetary gear set so that rotation of the output shaft causes rotation of the first component, the input shaft of the gearbox is connected to a second component of the three components of the planetary gear set so that rotation of the input shaft causes rotation of the second component, and the rotor of the electric machine is connected to a third component of the three components of the planetary gear set so that rotation of the rotor causes rotation of the third component;

the propulsion system further comprises locking means movable between a locking position, in which two of the three components of the planetary gear set are interlocked so that the three components of the planetary gear set rotate at an identical rotational speed, and a releasing position, in which the three components of the planetary gear set are allowed to rotate at different rotational speeds; and the method is started when the vehicle is being driven forward with the locking means in the releasing position and the third component of the three components of the planetary gear set rotates at a higher rotational speed than the first component of the three components of the planetary gear set;

the method comprising the following steps:

a) controlling the electric machine to apply a brake torque requested to the input shaft of the gearbox exceeding a torque equal to a product of: (1) a torque needed for driving the combustion engine to rotate and (2) a transmission ratio of the planetary gear set;

b) checking and comparing the rotational speeds of at least two of the sun gear, the ring gear and the planet wheel carrier; and c) moving the locking means to the locking position when the rotational speeds in step b) are substantially equal, wherein step a) is continued while repeatedly or continuously carrying out step b) until the comparing in step b) shows that the rotational speeds of two of the sun gear, the ring gear, and the planet wheel carrier are substantially equal.

2. The method according to claim 1, wherein the vehicle has the propulsion system with the sun gear as the first component and the ring gear as the third component that is braked.

3. The method according to claim 1, wherein step b) comprises comparing the rotational speeds of the sun gear and the ring gear.

4. The method according to claim 1, wherein step c) comprises interlocking the sun gear and the planet wheel carrier.

5. The method according to claim 1, wherein step a) comprises controlling the electric machine to apply a brake torque through the third component of the three components of the planetary gear set to the input shaft of the gearbox, exceeding the product in step a) by at least 1%.

6. A computer program product comprising a non-transitory data storing medium readable by a computer, wherein a computer program comprising computer program code is stored in the non-transitory data storing medium and the computer program code of the computer program is for bringing the computer to implement the method according to claim 1 when the computer program code is executed in the computer.

7. An electronic control unit of the vehicle of claim 6, wherein the electronic control unit is the computer of claim 6, the electronic control unit comprising a central processor unit, a memory connected to the central processor unit, and the non-transitory data storing medium of claim 6 connected to the central processor unit, wherein the computer program code of the computer program of claim 6 is stored on the non-transitory data storing medium.

8. The vehicle comprising the electronic control unit according to claim 7.

* * * * *